(12) United States Patent
Hammes et al.

(10) Patent No.: US 12,529,521 B2
(45) Date of Patent: Jan. 20, 2026

(54) BLAST LANCE FOR GAS BLOWING, ITS USE AND METHOD OF PRODUCTION

(71) Applicant: IMERTECH SAS, Paris (FR)

(72) Inventors: Kai Hammes, Neuwied (DE); Daniel Hollricher, Klingelbach (DE)

(73) Assignee: IMERTECH SAS, Paris (FR)

( * ) Notice: Subject to any disclaimer, the term of this patent is extended or adjusted under 35 U.S.C. 154(b) by 464 days.

(21) Appl. No.: 18/001,044

(22) PCT Filed: Jun. 8, 2021

(86) PCT No.: PCT/EP2021/065349
§ 371 (c)(1),
(2) Date: Dec. 7, 2022

(87) PCT Pub. No.: WO2021/250032
PCT Pub. Date: Dec. 16, 2021

(65) Prior Publication Data
US 2023/0228491 A1 Jul. 20, 2023

(30) Foreign Application Priority Data
Jun. 8, 2020 (EP) .................................... 20305608

(51) Int. Cl.
*F27D 3/16* (2006.01)
(52) U.S. Cl.
CPC .......... *F27D 3/16* (2013.01); *F27D 2003/169* (2013.01)
(58) Field of Classification Search
CPC ................. F27D 3/16; F27D 2003/169; F27D 2003/168; F27B 3/22; C21C 5/4613
(Continued)

(56) References Cited

U.S. PATENT DOCUMENTS 2,472,416 A    6/1949   Gibson
3,778,250 A * 12/1973   Bernsmann ............... C21C 7/06
                                                                                75/546
(Continued)

FOREIGN PATENT DOCUMENTS

CN       101013000 A    8/2007
CN       202279835 U    6/2012
(Continued)

OTHER PUBLICATIONS

JP2004317097, Nanba et al., Construction Method of Coated Monolithic Refractory of Lance Pipe By Horizontal Casting Construction, Nov. 11, 2004 (Year: 2004).*
(Continued)

*Primary Examiner* — Jessee R Roe
*Assistant Examiner* — Michael Aboagye
(74) *Attorney, Agent, or Firm* — RENNER, OTTO, BOISSELLE & SKLAR, LLP (57) ABSTRACT

The present invention relates to blast lances for gas blowing in metallurgical processes, the blast lance comprising a cylindrical lance core and a refractory casing, wherein the said refractory casing comprises n+1 refractory tubular sections and n or more refractory annular structures, wherein each set of two neighbouring refractory tubular sections is connected via a refractory annular structure, and wherein n is an integer of 1 or higher. The invention further relates to the use and method of production of such blast lances.

11 Claims, 5 Drawing Sheets

(58) Field of Classification Search
USPC .......................... 266/225, 265, 266, 268, 47
See application file for complete search history.

(56) References Cited

U.S. PATENT DOCUMENTS

| | | | | |
|---|---|---|---|---|
| 4,097,030 | A * | 6/1978 | Desaar | C21C 1/02 266/225 |
| 4,367,868 | A * | 1/1983 | Blom | B32B 9/041 266/225 |
| 10,801,082 | B2 * | 10/2020 | Hicks | C21C 5/4613 |
| 2005/0110202 | A1 | 5/2005 | Barrett et al. | |
| 2007/0040308 | A1 * | 2/2007 | Ekman | C21C 5/4613 266/225 |
| 2018/0087121 | A1 * | 3/2018 | Kreierhoff | C21C 5/4613 |

FOREIGN PATENT DOCUMENTS

| | | | | |
|---|---|---|---|---|
| CN | 202543238 | U | 11/2012 | |
| CN | 104879582 | A | 9/2015 | |
| DE | 4304538 | | 5/1994 | |
| EP | 2712938 | | 4/2014 | |
| JP | 2004317097 | * | 11/2004 | F27D 3/16 |
| JP | 2004317097 | A | 11/2004 | |
| WO | WO2016/166189 | A1 | 10/2016 | |
| WO | 2021250032 | A1 | 12/2021 | |

OTHER PUBLICATIONS

Second Office Action issued in related Chinese Patent Application No. 2021-80041160.9 dated Nov. 21, 2024 along with the English-language translation.
Third Office Action issued in related Chinese Patent Application No. 202180041160.9 dated Apr. 28, 2025.
International Search Report and Written Opinion mailed Jul. 30, 2021, in International Application No. PCT/EP2021/065349 (15 pages).
Office Action (with English translation) mailed Apr. 15, 2024 from related/corresponding Chinese Patent Appl. No. 202180041160.9.
Decision of Rejection issued in related Chinese Patent Application No. 202180041160.9 dated Jul. 21, 2025.

* cited by examiner

BLAST LANCE FOR GAS BLOWING, ITS USE AND METHOD OF PRODUCTION

CLAIM FOR PRIORITY

This application is a U.S. national phase entry under 35 U.S.C. § 371 from PCT International Application No. PCT/EP2021/065349, filed Jun. 8, 2021, which claims the benefit of priority of European Patent Application No. 20305608.0, filed Jun. 8, 2020, from all of which this application claims priority and all of which are incorporated herein by reference.

FIELD OF THE INVENTION

The present invention relates to a blast lance for gas blowing. The invention further relates to the use of a blast lance for gas blowing, as well as a method of production.

BACKGROUND OF THE INVENTION

Blast lances are used in metallurgical processes for gas blowing. Blast lances are employed for blowing gas over or through molten metals during metallurgical processes, such as oxygen steelmaking, or for degassing molten metals. In particular during degassing processes, during which an inert gas such as nitrogen or argon may be blown into a molten metal or alloy composition, by dipping a blast lance into the molten metal or alloy composition, the chemical, thermal and mechanical stresses on the blast lance are considerable. During dipping the blast lance tip is exposed to thermal stress in view of the high temperature of the molten metal. In addition, near the surface of the molten metal, there may be a substantial amount of slag present, which has corrosive properties. The high density and movements of the molten metal also leads to mechanical stress on the entire blast lance, since this is being moved through a heavy and often viscous liquid, causing strong mechanical momentum, in particular on the slag area of the blast lance. Accordingly, the blast lance material needs to meet a variety of different, often contradictory, requirements.

Blast lances for gas blowing in metallurgical applications are generally formed of refractory materials, such as refractory concrete. Various types of refractory concrete with differing properties are known to the skilled person in the art. Refractory concretes generally require the use of a refractory bonding system to allow them to withstand high temperature conditions. Materials may include calcium aluminate cements, fire clay, ganister and minerals high in aluminium content. For example, bauxite concrete has a particularly good high temperature resistance and temperature change resistance, whereas high alumina concrete has good chemical stability. On the contrary, better value fire-clay containing concrete may be used for the structural (upper) portion of a blast lance, which requires lower chemical or thermal stability.

Japanese Unexamined Patent Application No. 2004317097 discloses method for forming a blast lance by horizontal casting, wherein one or more partition plates are arranged within the lance cast, and different types of refractory coatings are cast in the different sections formed by the partition plates. The partition plates may be made of acrylic resin, plastic, paper or rubber, and need to be withdrawn subsequent to casting of the monolithic refractory coating, adding a process step, and potentially leaving a gap between adjacent sections of refractory coating in the blast pipe. The state of the art therefore presents a problem.

SHORT DESCRIPTION OF THE INVENTION

The present invention is defined in the appended claims.

In particular, the present invention is embodied by a blast lance for gas blowing in metallurgical processes, the blast lance comprising a cylindrical lance core and a refractory casing, wherein the refractory casing comprises n+1 refractory tubular sections and n or more refractory annular structures, wherein each set of two neighbouring refractory tubular sections is connected via a refractory annular structure, and wherein n is an integer of 1 or higher. In one embodiment, the blast lance for gas blowing is a blast lance for vertical gas blowing. It was found that the problems of the prior art did not occur with the blast lance according to the present invention.

In one embodiment of the present invention, the refractory annular structures may have an outer diameter which corresponds to the outer diameter of the refractory tubular sections, and an inner diameter which corresponds to the inner diameter of the refractory tubular sections. In accordance with this embodiment, good structural stability of the blast lance according to the invention could be achieved.

In one embodiment of the present invention, each refractory annular structure may be made of the same material as either of the neighbouring refractory tubular sections it connects. In accordance with this embodiment, good structural uniformity of the blast lance according to the invention could be achieved.

In one embodiment of the present invention, the refractory annular structures and the refractory tubular sections may be made of concrete. It was found that refractory concrete was particularly suitable according to the present invention.

In one embodiment of the present invention, each refractory annular structure may be additionally equipped with slot pins for securing the annular structure to the neighbouring refractory tubular sections. According to this embodiment, the connection between the annular structure and the refractory tubular section it touches was rendered more stable. This effect is particularly noteworthy when the slot pins are made of steel, such as stainless steel.

In one embodiment of the present invention, each refractory annular structure consists of two half-ring shaped portions connected by mortar. It was found that this particular structure rendered the method of production of the blast lance easier and more efficient.

In one embodiment of the present invention, a first refractory tubular section is made of a first material and a second refractory tubular section is made of a second material, which is different from the first material. According to this embodiment, different material properties may be imparted to different portions of the blast lance. Furthermore, a third refractory tubular section may be made of third material which may be different from either the first material, or the second material, or both the first and second materials. As the case may be, it may be required that several sections of the blast lance according to the invention have several specific material property requirements, which are best achieved using as many different sections of different refractory materials. Similarly, according to further embodiments of the present invention, further refractory tubular sections may be present, of further different refractory materials.

Also part of the present invention is the use of a blast lance according to the invention in gas blowing in metallurgical processes. It was found that the blast lance according to the present invention had a longer lifetime than blast lances according to the state of the art. In one embodiment, the present invention is directed to the use of the blast lance according to the invention in vertical gas blowing in metallurgical processes.

Also part of the present invention is a method of formation of a blast lance according to the invention. The method comprises the steps of providing a longitudinal horizontal casting mould for casting a blast lance, inserting n or more refractory annular structures into the longitudinal horizontal casting mould, inserting a cylindrical lance core into the longitudinal horizontal casting mould such that the cylindrical lance core passes through the central holes of the n or more annular ceramic structures, casting n+1 refractory tubular sections, wherein each refractory tubular section is separated from a neighbouring refractory tubular section by a refractory annular structure, allowing the cast material to set, and removing the longitudinal horizontal casting mould, wherein n is an integer of 1 or higher. This particular method of production was faster and more efficient than the methods according to the state of the art, and the advantageous blast lance according to the present invention could be obtained.

SHORT DESCRIPTION OF THE FIGURES

The invention will be further illustrated by reference to the following figures.

It is understood that the following description and references to the figures concern exemplary embodiments of the present invention and shall not be limiting the scope of the claims.

DETAILED DESCRIPTION OF THE INVENTION

The present invention according to the appended claims provides for blast lances for gas blowing in metallurgical processes, their use and the production thereof. According to the present invention, it is possible to provide blast lances with good durability and longevity. It is further possible to fine tune the properties of the blast lances according to the present invention to adapt them to specific requirements as may be present in a given context. In one embodiment, the blast lances are for vertical gas blowing in metallurgical processes.

According to one aspect of the present invention, a blast lance 1 is provided, which is suitable for vertical gas blowing in metallurgical processes and which may be produced by horizontal casting. In particular, the blast lance 1 comprises a cylindrical lance core 2 and a refractory casing 3, wherein the refractory casing 3 comprises a number of refractory tubular sections 4 separated by refractory annular structures 5. In view of this arrangement, according to the present invention, a refractory casing 3 of the blast lance 1 according to the present invention comprises an alternative arrangement of refractory tubular sections 4 and refractory annular sections 5, wherein the longitudinal ends of the blast lance 1 may be formed by refractory tubular sections 4. Preferably, at least one longitudinal end of the of the blast lance 1 is formed by a refractory annular section 5, usually, this longitudinal end is opposite to the free board side of the blast lance 1. Accordingly, the blast lance 1 comprises n or more refractory annular structures 5 and n+1 refractory tubular sections 4, wherein n is an integer of 1 or higher. In one example, one longitudinal end of the blast lance 1, usually the free board side end, is formed from a non-ceramic material, such as a metal.

Blast Lance and Method of Production

Blast lances for gas blowing in metallurgical processes are well known in the art. They are generally formed of a hollow lance core through which a gas may be blown. The lance core is ideally protected by a stable casing, such as for example a refractory casing. In particular in those cases where a blast lance may be exposed to high temperatures, a refractory casing must be employed. In addition, depending on the intended use, various additional factors must be considered when designing a blast lance. These may comprise, among others, the chemical environment, thermal stresses caused by temperature changes, mechanical stresses that the blast lance may be exposed to during use, cost, ease of production, manoeuvrability, or total weight.

According to the present invention, it is possible to provide a blast lance 1 in which the refractory casing 3 of the lance core 2 consists of separate sections which may meet different requirements. The refractory casing 3 consists of a number of refractory tubular sections 4 arranged side by side along the lance core 2, separated by refractory annular structures 5. The refractory tubular sections 4 and refractory annular structures 5 together make up the refractory casing 3 of the lance core 2, forming the blast lance 1 of the present invention.

Figure 3:
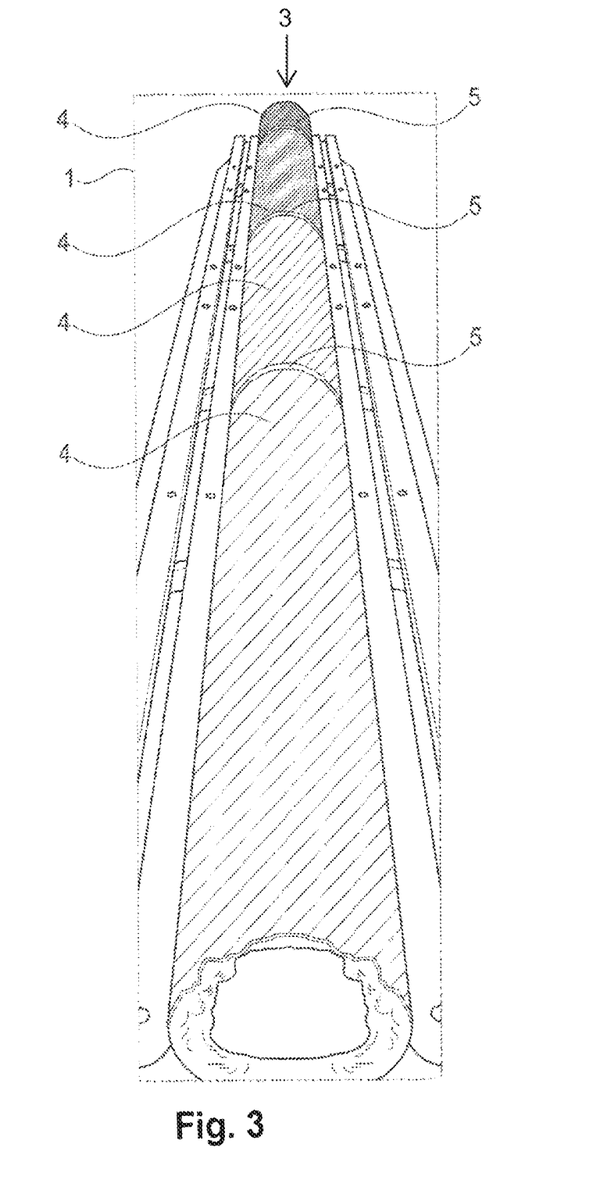
FIG. 3 shows a drawing of the cast blast lance of FIGS. 1 and 2, after demoulding.

FIG. 3 shows an exemplary blast lance 1 according to the present invention, consisting of four (n+1) separate refractory tubular sections 4, separated by three (n) refractory annular structures 5, straight after demoulding.

The blast lance 1 according to the present invention may comprise refractory tubular sections 4 made of different materials, and which have different properties as may be required. For example, any one refractory tubular section 4 may be made of a particular refractory concrete, which may have good mechanical properties. Alternatively, a particular refractory concrete of any one refractory tubular section 4 may have good chemical stability. Alternatively, a particular refractory concrete of any one refractory tubular section 4 may be of good value while offering satisfactory material properties. Alternatively, a particular refractory concrete of any one refractory tubular section 4 may present a good compromise between different properties.

Figure 4:
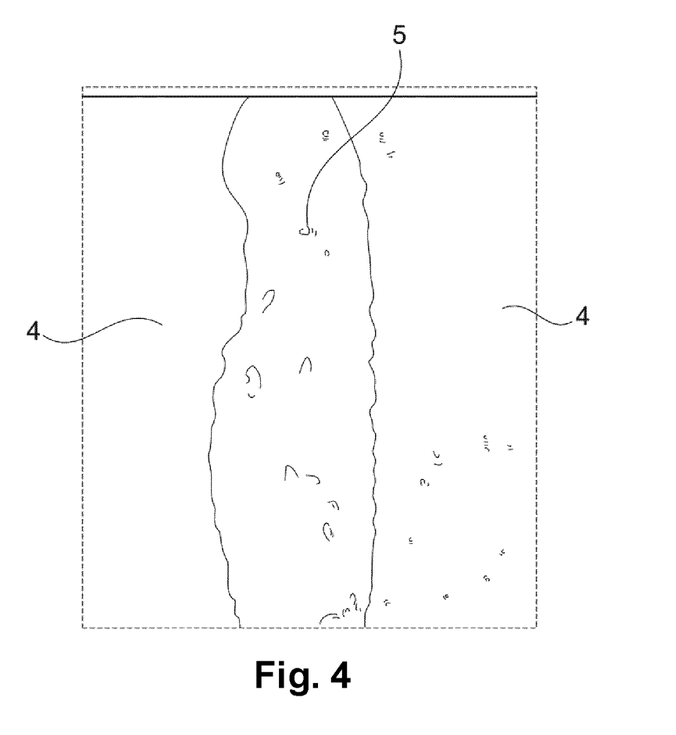
FIG. 4 shows a sideways drawing of a refractory annular structure with portions of the two adjacent refractory tubular elements after demoulding of the cast blast lance of FIGS. 1 and 2.

The refractory annular structures 5 of the blast lance 1 according to the invention are positioned between neighbouring refractory tubular sections 4. Through the process of formation of the blast lance 1, which also forms part of the present invention, the refractory tubular sections 4 naturally adhere to the refractory annular structures 5. This is illustrated in FIG. 4, which shows a sideways view of a refractory annular structure 5 in contact with two refractory tubular elements 4. This adherence may be especially strong where the refractory annular structures 5 and the refractory tubular sections 4 are made of refractory concrete, in particular in cases where the material of a refractory annular structure 5 is the same as the material of one of the adjacent refractory tubular sections 4. According to the present invention, the adherence between the various elements making up the blast lance 1, in combination with the structurally stabilising effect of the cylindrical lance core 2, is such that good overall structural stability is formed, leading to the provision of a strong and mechanically resistant blast lance 1.

Figure 1:
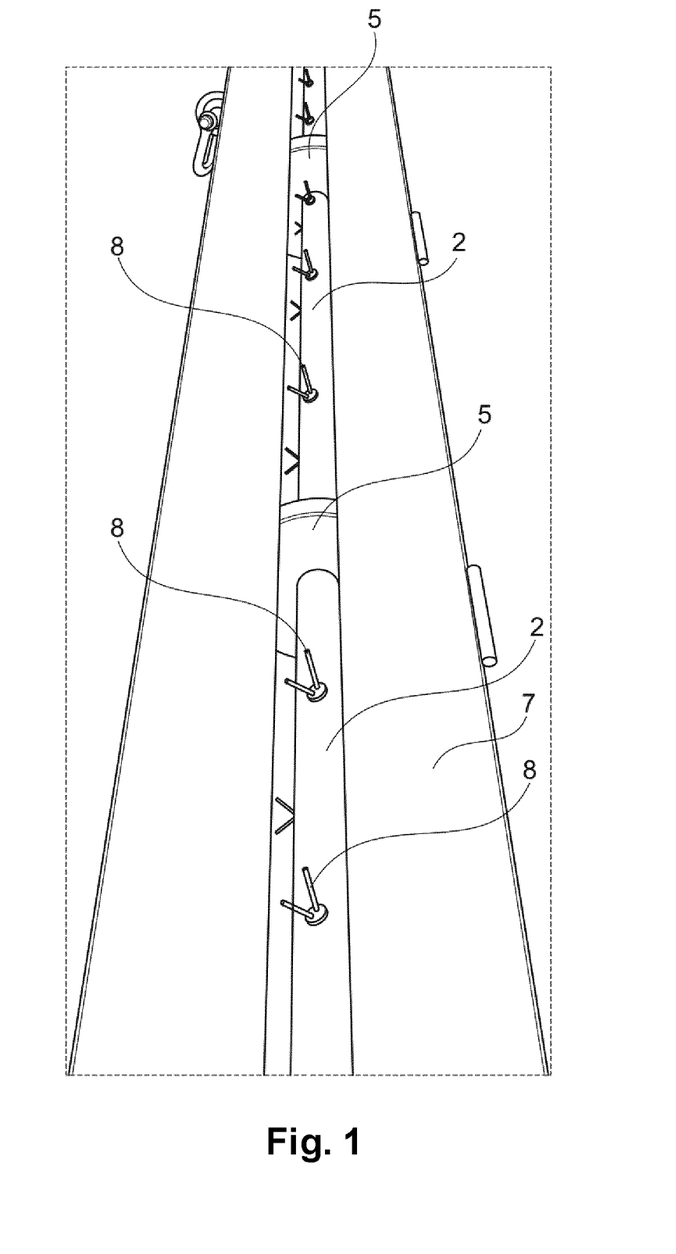
FIG. 1 shows a drawing of a casting mould for forming a blast lance according to the present invention, wherein refractory annular structures have been inserted, prior to casting of refractory tubular elements.

The method of production according to the present invention involves a horizontal casting process of the blast lance 1. According to the specific method of production of the present invention, a lance core 2 and refractory annular structures 5 are provided. The refractory annular structures 5 are placed around the lance core 2 within a longitudinal casting mould 7, in the desired positions where they should be found in the finished blast lance 1, and in such a way that the lance core 2 passes through the central holes of the refractory annular structures 5. In order to improve adherence between the lance core 2 and the refractory tubular sections 4 after casting, the lance core 2 may be provided with reinforcement anchor systems 8. This is illustrated by FIG. 1, in which two separate refractory annular structures 5 may be discerned, placed around a lance core 2 in different spaced apart positions, within a casting mould 7. In order to obtain good sealing between the different sections formed by the refractory annular structures 5, it is advantageous that the inner diameter of the refractory annular structures 5 corresponds to the outer diameter of the lance core 2. In addition, the internal diameter of the casting mould 7 should correspond to the external diameter of the refractory annular structures 5. Accordingly, the inner and outer diameters of the refractory annular structures 5 will correspond to the inner and outer diameters of the refractory tubular sections 4 after casting, respectively.

Figure 2:
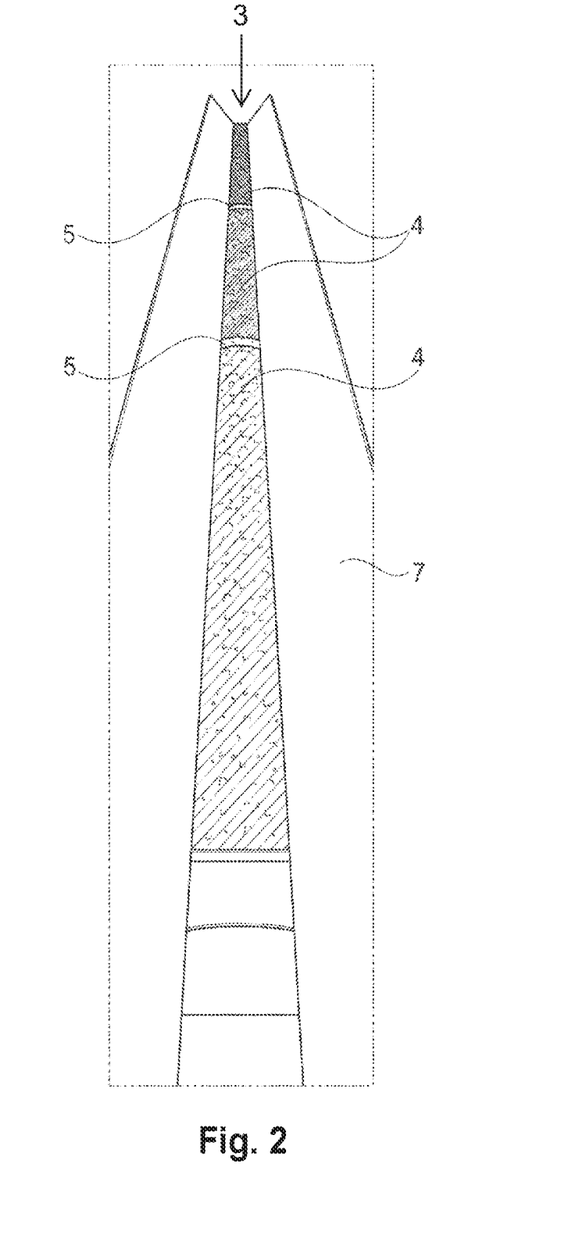
FIG. 2 shows a drawing of the casting mould of FIG. 1, after casting of refractory tubular elements.

With the refractory annular structures 5 and the lance core 2 positioned within the casting mould 7, the n+1 refractory tubular sections 4 may now be cast into the casting mould 7. As illustrated by FIG. 2, the cast n+1 refractory tubular sections 4 may be made of different materials, and are separated by the refractory annular structures 5 within the casting mould 7. As will be apparent to the skilled person in the art, during casting of the n+1 refractory tubular sections 4, it will be imperative to ensure good dispersion of the cast within the apportioned sections in the casting mould 7, in order to avoid the formation of bubbles within the cast material, to compact the refractory material, and to ensure best possible contact with the refractory annular structures 5. This may be achieved using vibration, self-flowing castables or other means known to the skilled person in the art. Castables are usually considered self-flowing castables in case they are able to flow and de-air without the application of external energy, such as vibrational energy. In case vibration is used for compacting the refractory material, vibration is usually conducted at a frequency within the range of 8000 to 15000 vibrations per minute. The vibrational frequency required is known to depend on parameters, such as type of mix, the temperature of the mix, the size and shape of the mould and the type of vibrating equipment used, and the skilled person would adapted the vibrational frequency accordingly.

In order to obtain a lance core 1 with a uniform surface, it will be advantageous to cast the said refractory tubular sections 4 to such a size that their external diameter corresponds to the external diameter of the refractory annular structures 5. In order to achieve this, the internal diameter of the casting mould 7 should correspond to the external diameter of the refractory annular structures 5.

After setting of the cast n+1 refractory tubular sections 4, demoulding may occur in the usual way known to the skilled person in the art.

According to the present invention, the blast lance 1 formed by the method of the invention will comprise a lance core 2 and a refractory lance casing 3, which in turn comprises n+1 refractory tubular sections 4, separated by n refractory annular structures 5. Additional refractory annular structures 5 may be present at one or either longitudinal end of the blast lance 1, leading to the presence of more than n refractory annular structures 5. The n+1 refractory tubular sections 4 may be made of different refractory materials, with differing properties, and the n or more refractory annular structures 5 may be made of the same refractory material as one of the adjoining refractory tubular sections 4.

Refractory Tubular Sections

As described above, the refractory tubular sections 4 of the blast lance 1 according to the present invention are cast within a casting mould 7 in sections formed by the presence of refractory annular structures 5. Given that the refractory annular structures 5 preferably correspond in size to the casting mould 7 and the lance core 2, such that the outer diameter of the lance core 2 correspond to the inner diameter of the refractory annular structures 5, and the inner diameter of the casting mould 7 corresponds to the outer refractory annular structures 5, the inner and outer diameters of the refractory tubular sections 4 shall preferably correspond to the inner and outer diameters of the refractory annular structures 5, respectively.

The refractory tubular sections 4 may be made of different materials, depending on the required properties. They are preferably made of refractory concrete, since these materials are well known and generally easy to cast using the process according to the present invention. For example, high alumina concrete may be used in areas where good chemical resistance is required. Further, bauxite based concrete may be used in areas where good thermal stability is required. Further, comparatively good value fireclay based concrete may be used in areas where the refractory requirements are not as intense, but where structural stability and shielding is required.

The casting process for the formation of the refractory tubular sections 4 is carried out using methods known to the skilled person in the art. In order to obtain good quality dense material with good adherence and uniformity, the material should be vibrated during casting to aid setting. After demoulding, the refractory tubular sections 4 adhere to the lance core 2, optionally aided by reinforcement anchor systems 8, and the refractory annular structures 5, together forming the blast lance 1 according to the present invention.

Refractory Annular Structures

The refractory annular structures 5 act as separators between adjacent refractory tubular sections 4. As described above, they are placed in the desired positions within a casting mould 7 around a lance core 2. In order to improve separations between the different sections during the casting process, it is advantageous that the inner diameter of the refractory annular structures 5 corresponds to the outer diameter of the lance core 2, and that the outer diameter of the refractory annular structures 5 corresponds to the inner diameter of the casting mould 7.

Figure 5:
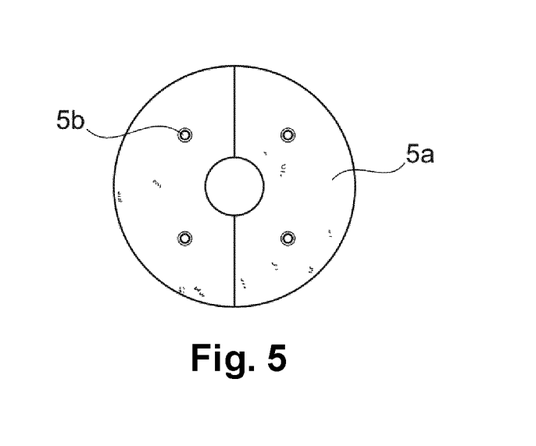
FIG. 5 shows a drawing of an exemplary refractory annular structure.

In order to render the installation of the refractory annular structures 5 during the production process easier, the refractory annular structures 5 may be formed of separate half-ring shaped portions 5a and 5b. This particular embodiment is illustrated by FIG. 5. Particularly in the case where the lance core 2 is provided with reinforcement anchor systems 8, this arrangement is needed in order to allow the lance core 2 to pass through the central overtures of the refractory annular structures 5. Accordingly, during the production process, the refractory annular structures 5 would be provided in the shape of half-ring shaped portions 5a and 5b, and one of the half-ring shaped portions 5a would be installed within the casting mould 7, followed by the lance core 2, and the refractory annular structures 5 would then be formed by the placing of the respective second half-ring shaped portions 5b.

The refractory annular structures 5 may be made of different materials, while they are preferably made of a refractory concrete. In particular, it is advantageous that the refractory annular structures 5 are made of the same material as any one of the adjacent refractory tubular sections 4. This leads to improved uniformity of the properties and the structure of the finished blast lance 1, and improves adherence between the refractory tubular sections 4 and the refractory annular structures 5.

Slot Pins

Figure 6:
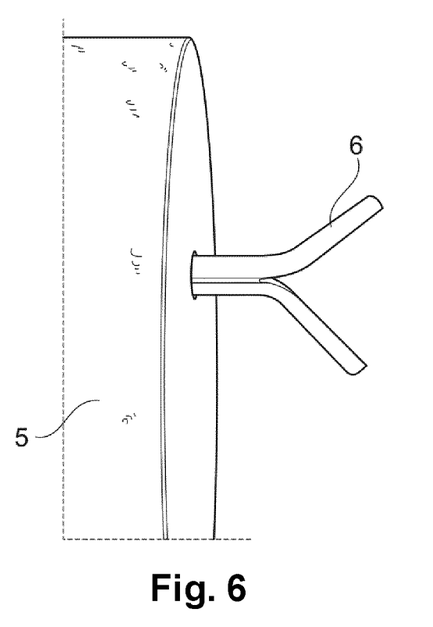
FIG. 6 shows a drawing of an exemplary refractory annular structure, including slot pin for securing and reinforcing the annular structure to a neighbouring refractory tubular section.

According to one embodiment of the present invention, the refractory annular structures 5 may be provided with slot pins 6. This is illustrated in FIG. 6. The slot pins 6 may also be present in case the refractory annular structures 5 are formed of half ring-shaped portions 5a, 5b. After casting and setting of the refractory tubular sections 4, the slot pins 6 serve to hold the refractory tubular sections 4 in place at either side of the refractory annular structures 5. This provides additional stability, to the blast lance 1 according to the present invention. The slot pins may be made of metal, such as for example steel, such as stainless steel.

It should be noted that the present invention may comprise any combination of the features and/or limitations referred to herein, except for combinations of such features which are mutually exclusive. The foregoing description is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims.

EXAMPLE

A blast lance was formed in accordance with the process of the present invention. A 3800 mm casting mould with an inner diameter of 230 mm and a lance core with an outer diameter of approximately 57 mm were used. Concrete rings as refractory annular structures were provided, having an outer diameter of 227 mm, an inner diameter of approximately 57 mm and a thickness of 40 mm. The concrete rings were produced as half rings. Three pairs of half rings and the lance core were placed within the casting mould at such intervals as to form sections of approximately 580 mm (head section), 1160 mm (bath section), 960 mm (slag section) and 980 mm (cold section). Each pair of half rings was bound together using mortar and by doing so forming a complete ceramic disc. Each disc was provided with four double slot pins to reinforce and secure the refractory annular sections with four anchors at each surface of the refractory tubular sections.

In the casting step, the four sections formed were filled with different types of concrete (all provided by Calderys Deutschland GmbH). The head section was filled with Calde Cast LT 96 SP RSH (tabular alumina based concrete). The bath section was filled with Calde Cast LB 85 G8 (TKS) RSH (bauxite based concrete). The slag section was filled with Calde Cast LT 96 SP RSH (tabular alumina based concrete). The cold section was filled with Calde Cast F50 G10 (fireclay based concrete). After vibration-aided casting, setting and demoulding, the blast lance was ready to use.

For this production, an existing casting mould could be employed, which did not need to be adapted to this particular production process. In addition, the production process was safe and straightforward to handle.

In some examples the connection between the cast components may be improved due to the presence of the concrete annular structures, which themselves did not need to be removed prior to use of the blast lance. During use, the blast lance according to the present invention may have improved durability compared to blast lances formed by different processes.

REFERENCE NUMERALS

1 Blast lance
2 Lance core
3 Refractory casing
4 Refractory tubular section
5 Refractory annular structure
5a Half-ring shaped portions
5b Half-ring shaped portions
6 Double Slot pin
7 Longitudinal horizontal casting mould
8 Reinforcement anchor systems

The invention claimed is:

1. A blast lance for gas blowing in metallurgical processes, the blast lance comprising a cylindrical lance core and a refractory casing, wherein the refractory casing comprises n+1 refractory tubular sections and n or more preformed refractory annular structures, wherein adjacent refractory tubular sections are separated via one of the n or more preformed refractory annular structures, wherein n is an integer of 1 or higher, and wherein
the refractory annular structures have an outer diameter which corresponds to the outer diameter of the refractory tubular sections, and an inner diameter which corresponds to the inner diameter of the refractory tubular sections.

2. A blast lance according to claim 1, wherein each refractory annular structure is made of the same material as either of the adjacent refractory tubular sections it connects.

3. A blast lance according to claim 1, wherein the refractory annular structures and the refractory tubular sections are made of concrete.

4. A blast lance according to claim 1, wherein each said refractory annular structure is additionally equipped with slot pins for securing the annular structure to the adjacent refractory tubular sections.

5. A blast lance according to claim 4 wherein the slot pins are made of steel.

6. A blast lance according to claim 1, wherein each said refractory annular structure consists of two half-ring shaped portions connected by mortar.

7. A blast lance according to claim 1, wherein a first refractory tubular section is made of a first material and wherein a second refractory tubular section is made of a second material different from the said first material.

8. A blast lance according to claim 7, wherein a third refractory tubular section is made of a third material which is different from either the first material, or the second material, of both the first and second materials.

9. A blast lance according to claim 3 wherein each said refractory annular structure is additionally equipped with slot pins for securing the annular structure to the adjacent refractory tubular sections.

10. A blast lance according to claim 9 wherein the slot pins are made of steel.

11. Method of formation of a blast lance according to any one of claim 1, comprising the steps of
   providing a longitudinal horizontal casting mould for casting a blast lance;
   inserting n or more preformed refractory annular structures into the longitudinal horizontal casting mould;
   inserting a cylindrical lance core into the longitudinal horizontal casting mould such that the cylindrical lance core passes through central holes of the n or more preformed annular structures;
   casting n+1 refractory tubular sections, wherein adjacent refractory tubular sections are separated via one of the n or more preformed refractory annular structure;
   allowing the cast to set; and
   removing the longitudinal horizontal casting mould;
wherein n is an integer of 1 or higher.

* * * * *